United States Patent
Chehade et al.

(10) Patent No.: US 10,518,680 B2
(45) Date of Patent: Dec. 31, 2019

(54) STOWABLE HEADREST ASSEMBLY

(71) Applicant: Ford Global Technologies, LLC, Dearborn, MI (US)

(72) Inventors: Saeed Chehade, Windsor (CA); Jonathan Gregory, Colchester (GB)

(73) Assignee: Ford Global Technologies, LLC, Dearborn, MI (US)

( * ) Notice: Subject to any disclaimer, the term of this patent is extended or adjusted under 35 U.S.C. 154(b) by 100 days.

(21) Appl. No.: 15/909,490

(22) Filed: Mar. 1, 2018

(65) Prior Publication Data

US 2019/0270396 A1  Sep. 5, 2019

(51) Int. Cl.
| | | |
|---|---|---|
| *A01K 29/00* | (2006.01) | |
| *B65G 69/28* | (2006.01) | |
| *B60N 2/835* | (2018.01) | |
| *B60N 2/829* | (2018.01) | |
| *B60N 2/02* | (2006.01) | |

(52) U.S. Cl.
CPC .............. *B60N 2/835* (2018.02); *B60N 2/829* (2018.02); *B60N 2002/0268* (2013.01)

(58) Field of Classification Search
CPC ........ B60N 2/829; B60N 2/832; B60N 2/888; B60N 2/206; B60N 2/3011; A47C 7/405; B60R 22/20; B60R 22/26
See application file for complete search history.

(56) References Cited

U.S. PATENT DOCUMENTS

| | | | | |
|---|---|---|---|---|
| 2,652,101 A | * | 9/1953 | Samsky ................. | B60N 2/832 |
| | | | | 297/114 |
| 2,886,097 A | * | 5/1959 | Katz ........................ | A47C 7/38 |
| | | | | 297/112 |
| 2,985,229 A | * | 5/1961 | Shamblin ............... | B60N 2/835 |
| | | | | 297/410 |
| 3,397,911 A | * | 8/1968 | Brosius, Sr. ........... | B60N 2/888 |
| | | | | 297/216.12 |
| 3,454,303 A | * | 7/1969 | Dangauthier .......... | B60N 2/832 |
| | | | | 297/396 |
| 6,192,565 B1 | * | 2/2001 | Tame ....................... | B60N 2/20 |
| | | | | 297/61 |
| 6,447,062 B1 | * | 9/2002 | Jaekel .................... | A47C 7/405 |
| | | | | 297/284.7 |
| 7,044,555 B2 | | 5/2006 | Saberan | |
| 7,090,251 B2 | * | 8/2006 | Tame ..................... | B60N 2/206 |
| | | | | 280/808 |
| 7,145,263 B2 | | 12/2006 | Nathan et al. | |
| 7,367,626 B2 | * | 5/2008 | Lawall ............... | B60N 2/42781 |
| | | | | 297/410 |
| 8,616,625 B2 | * | 12/2013 | Buccinna ............. | B60N 2/3011 |
| | | | | 297/61 |

(Continued)

OTHER PUBLICATIONS

Aaron Brzozowski, "Ford Has Invented a Stowable Neck Pillow for Vehicle Headrests," Ford Authority, Mar. 3, 2017 (5 pages).

*Primary Examiner* — Shin H Kim
(74) *Attorney, Agent, or Firm* — Vichit Chea; Price Heneveld LLP (57) ABSTRACT

A headrest assembly is provided herein. A headrest is coupled to a seatback. The seatback includes a housing. The headrest is movable between a first position wherein the headrest is exposed above the seatback, and a second position wherein the headrest is concealed within the housing. A top of the headrest is flush with a top of the seatback while in the second position.

11 Claims, 4 Drawing Sheets

(56) References Cited

U.S. PATENT DOCUMENTS

| | | | | |
|---|---|---|---|---|
| 8,894,142 | B2* | 11/2014 | Alexander | B60N 2/876 |
| | | | | 297/216.12 |
| 10,144,330 | B1* | 12/2018 | Leck | B60N 2/874 |
| 2006/0170271 | A1* | 8/2006 | Coccoli | B60N 2/809 |
| | | | | 297/410 |
| 2006/0244300 | A1 | 11/2006 | Watson Savage | |
| 2012/0001461 | A1 | 1/2012 | Alexander et al. | |

* cited by examiner

STOWABLE HEADREST ASSEMBLY

FIELD OF THE INVENTION

The present disclosure generally relates to a vehicle seat, and more specifically, a stowable headrest assembly.

BACKGROUND OF THE INVENTION

Some vehicle seating assemblies enable a user to adjust the position of the headrest. However, adjustments are unable to conceal the headrest when it is not in use. Additionally, a headrest can obstruct a driver's rearview when the headrest protrudes from the top of the seatback. Accordingly, there is a need for a headrest assembly that enables a user to conceal the headrest when it is not in use. The present disclosure is intended to satisfy this need.

SUMMARY OF THE INVENTION

According to a first aspect of the present disclosure, a headrest assembly is provided. A headrest is coupled to a seatback, the seatback including a housing. The headrest is movable between a first position wherein the headrest is exposed above the seatback, and a second position wherein the headrest is concealed within the housing. A top of the headrest is flush with a top of the seatback while in the second position.

Embodiments of the first aspect of the disclosure can include any one or a combination of the following features:
- an adjustment device disposed on the top of the headrest and configured to enable adjustment of the headrest when engaged;
- the adjustment device is flush with the top of the seatback when the headrest is in the second position;
- a specific pushing force exerted on the headrest enables adjustment of the headrest to the second position without engaging the adjustment device; and
- the headrest is movable to at least one intermediate position wherein the headrest is at least partially concealed within the housing.

According to a second aspect of the present disclosure, a headrest assembly is provided. A headrest is coupled to a seatback, the seatback including a housing. The headrest is movable between a first position wherein the headrest is exposed above the seatback, and a second position wherein the headrest is concealed within the housing. A pushing or pulling force exerted on the headrest enables adjustment of the headrest between first and second positions.

Embodiments of the second aspect of the disclosure can include any one or a combination of the following features:
- a rail disposed within the seatback and operably coupled to the headrest;
- the headrest includes a rod movably coupled to the rail, the pushing or pulling force resulting in translational displacement of the rod about the rail to enable adjustment of the headrest between first and second positions;
- a locking engagement coupled to the rod and configured to engage one of a plurality of notches extending a length of the rail to hold the position of the headrest;
- a cable coupled to both the adjustment device and locking pin, and configured to disengage the locking pin when the adjustment device is engaged; and
- each of the plurality of notches is associated with a unique position of the headrest.

According to a third aspect of the present disclosure, a headrest assembly is provided. A headrest is coupled to a seatback, the seatback including a housing. A bracket supports the headrest and is disposed within the seatback. The headrest is movable between a first position wherein the headrest is exposed above the seatback, and a second position wherein the headrest is concealed within the housing. An actuator is configured to raise or lower the bracket to adjust the headrest between the first and second positions.

Embodiments of the third aspect of the disclosure can include any one or a combination of the following features:
- at least one arm couples the headrest to the bracket;
- the bracket is movably coupled to a frame disposed within the seatback;
- the actuator is configured to translate the bracket vertically about the frame to adjust the headrest position;
- the actuator is configured to rotate a screw coupled to the bracket, and rotation of the screw causes the bracket to translate about the frame and an adjustment of the headrest position;
- a block at one end of the screw is configured to stop rotation of the screw when the block makes contact with the bracket;
- a pressure sensor configured to send the actuator a signal to adjust the position of the headrest when an occupant is in a vehicle seat;
- the pressure sensor is configured to send a signal to the actuator to adjust the position of the headrest to the second position when there is no occupant in the vehicle seat; and
- the actuator is programmed to adjust the headrest to a specific position when the pressure sensor detects an occupant in the vehicle seat.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary and may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a headrest assembly for a vehicle seat. The headrest assembly enables movement of a headrest between a first position wherein the headrest is exposed above a seatback, and a second position wherein the headrest is concealed within the seatback. A pushing or pulling force exerted on the headrest may enable adjustment of the headrest between first and second positions. In another embodiment, an actuator is configured to raise or lower a bracket disposed within the seatback to adjust the headrest between first and second positions.

Figure 1:
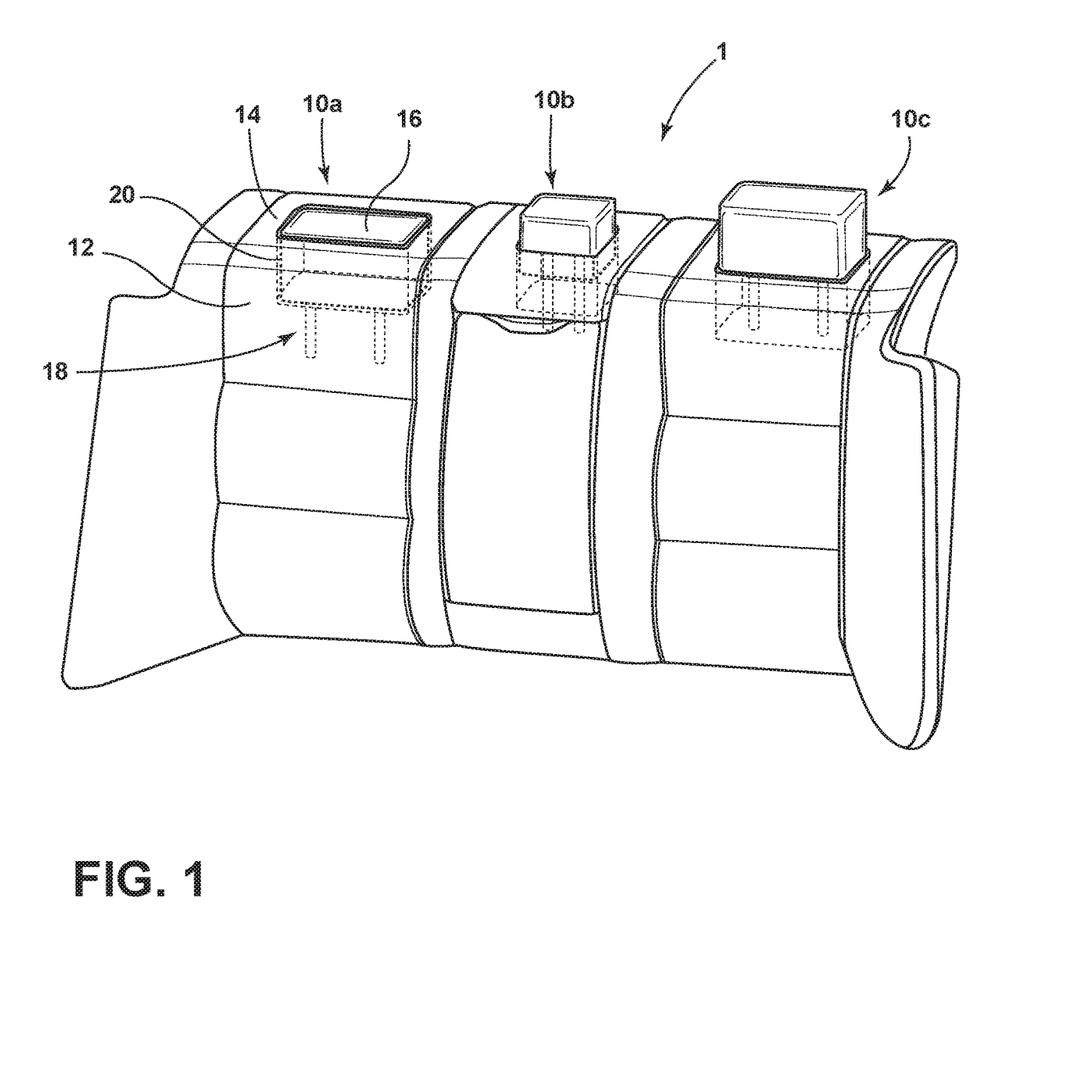
FIG. 1 is a perspective view of a vehicle seating assembly including a first, second and third vehicle seats each having a headrest in a stowed, intermediate-stowed, or unstowed position.

Referring to FIG. 1, a vehicle seating assembly 1 is shown. The vehicle seating assembly 1 includes a vehicle seat 10 having a seatback 12 with a top portion 14. A headrest 16 is disposed above the top portion 14 and is coupled to the seatback 12 via a headrest assembly 18. As described in greater detail herein, the headrest assembly 18 advantageously enables adjustment of the headrest 16 between a stowed position wherein the headrest 16 is concealed within a housing 20 of the seatback 12, and an unstowed position wherein the headrest 16 is exposed above the top portion 14 of the seatback 12. FIG. 1 depicts a first, second and third vehicle seat 10a, b, c. The first vehicle seat 10a includes headrest 16 in the stowed position, the second vehicle seat 10b includes a headrest 16 in an intermediate stowed position, and the third vehicle seat 10c includes a headrest 16 in the unstowed position.

Figure 2:
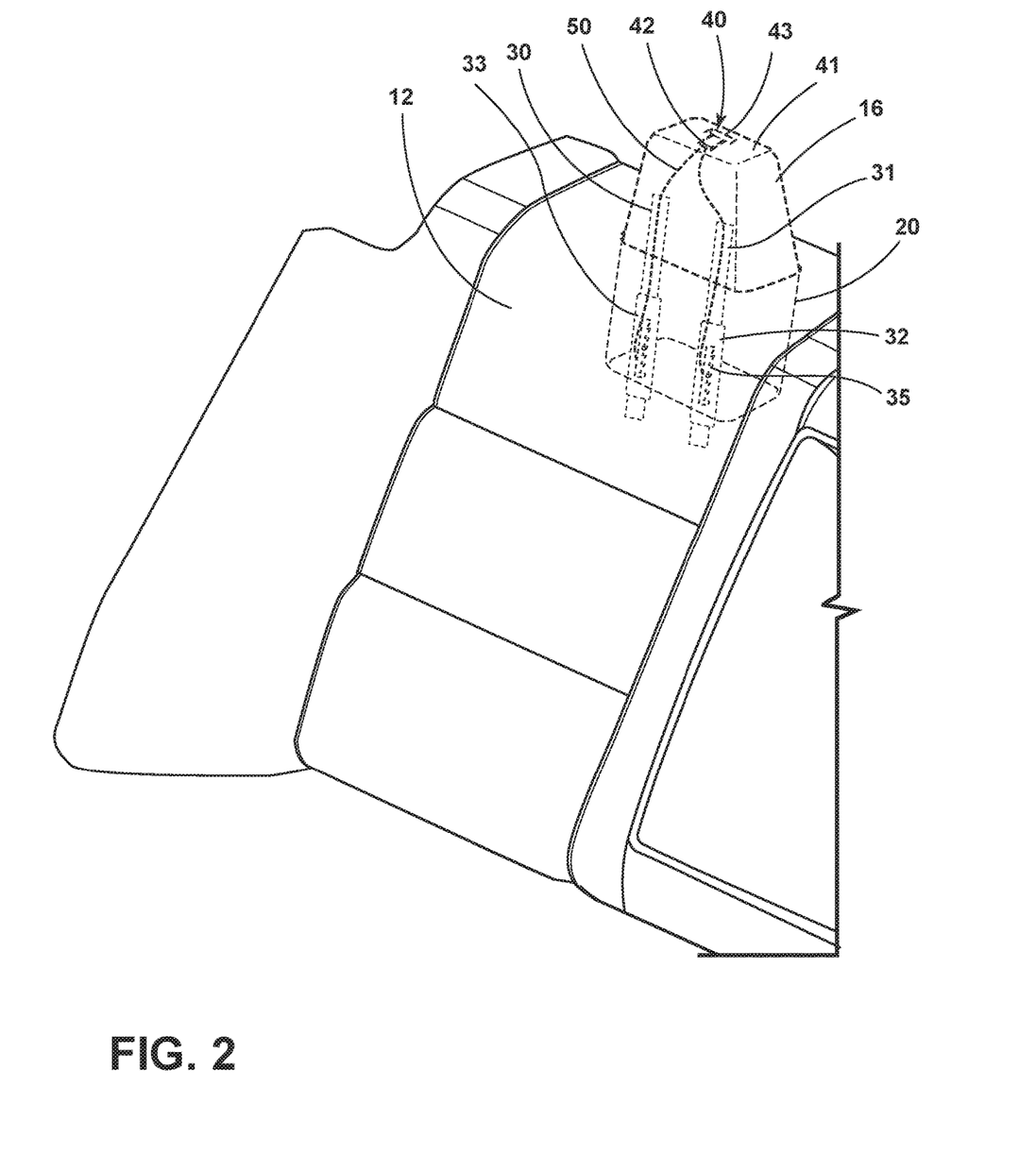
FIG. 2 is a perspective view of a vehicle seat including a headrest in an unstowed position.

In the first embodiment illustrated in FIG. 2, the headrest 16 is shown in an unstowed position and is exposed above the housing 20 and the seatback 12. The headrest 16 is supported above the housing 20 by a first and a second rod 30, 31. A first and a second rail 32, 33 disposed within the seatback 12 extend downwardly from the bottom of the housing 20. The first and second rods 30, 31 are movably coupled to the first and the second rails 32, 33, respectively. The first and second rods 30, 31 are configured to be translationally displaced about the first and second rails 32, 33. An adjustment device 40 is disposed on the top 41 of the headrest 16 and is configured to enable translational displacement of the first and second rods 30, 31 about the first and second rails 32, 33 when engaged. The adjustment device 40 is engaged when a user pulls upwards on a latch 42. A pocket 43 is proximate the latch 42 and allows the user to grip the latch 42 and pull upwards to enable adjustment of the headrest 16. When the adjustment device 40 is engaged, an upward pulling force applied to the adjustment device 40 and headrest 16 adjusts the headrest 16 to an unstowed position outside of the housing 20. A downward pushing force applied to the headrest 16 adjusts the headrest 16 to a stowed position, wherein the top of the headrest 16 is flush with the top 14 of the seatback 12 and the headrest 16 is concealed within the housing 20. The housing 20 is shown in phantom and is configured to accept the headrest 16 when the headrest 16 is lowered.

Figure 3:
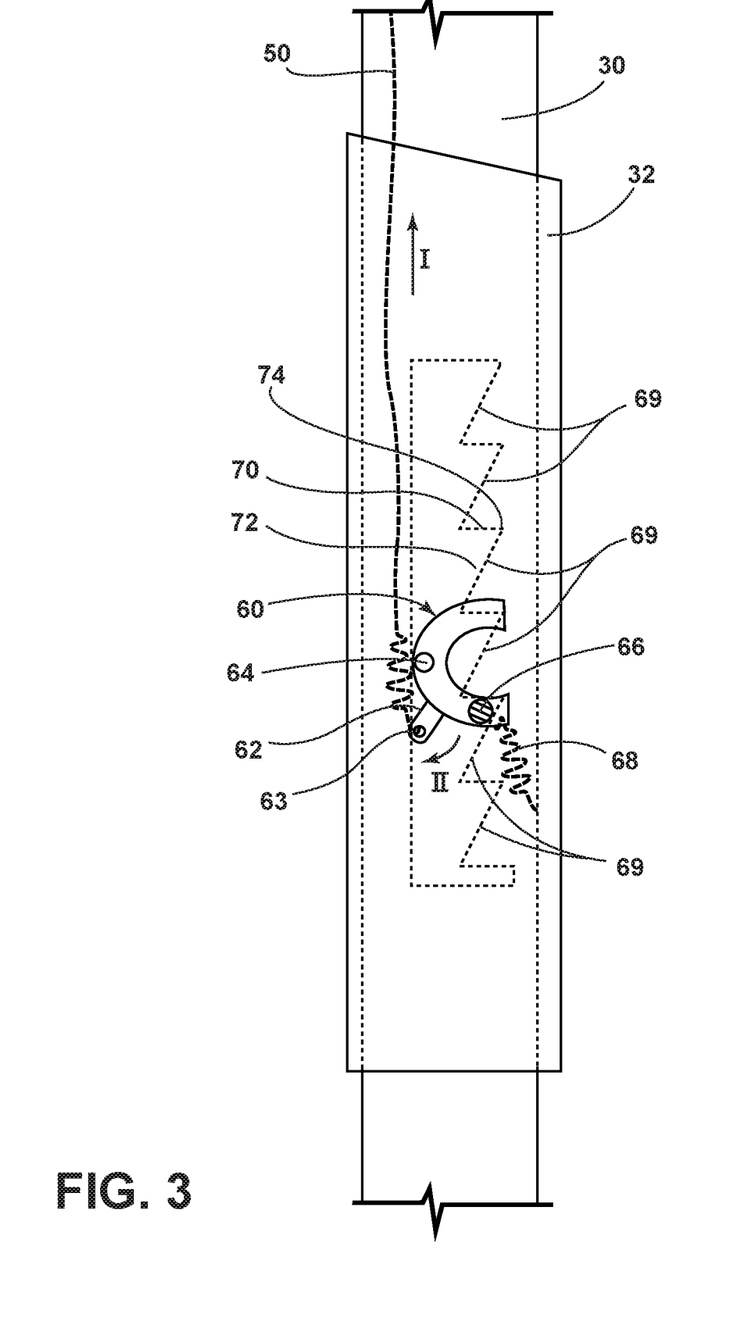
FIG. 3 illustrates a the headrest assembly with a locking pin engaged with a rail.

In reference to FIGS. 2-3, the first embodiment includes a cable 50 operably coupled to the latch 42 of the adjustment device 40. The cable 50 extends through the headrest 16 and into the seatback 12, where it connects to a locking engagement 60. The locking engagement 60 is affixed to least one of the first and second rods 30, 31. The locking engagement 60 includes a tab 62 having an attachment point 63 linked to the cable 50. The locking engagement 60 is configured to engage at least one of the first or second rails 32, 33 to hold the position of the first and second rods 30, 31. In FIG. 3, the locking engagement 60 is shown coupled to the first rod 30 at pivoting member 64. An engagement pin 66 engages one of a plurality of notches 69 extending a length of the rail 32 to prevent translational displacement of the rod 30 about rail 32. A retention spring 68 is linked to the locking engagement 60 and the rod 30. The spring 68 is configured to apply a force on the locking engagement 60 towards the plurality of notches 69, such that the engagement pin 66 is retained against one of the plurality of notches 69. The plurality of notches 69 each include an orthogonal edge 70 that meets an angled surface 72 at a corner 74. The angled surface 72 is configured to prevent the engagement pin 66 and rails 30, 31 from sliding downwards relative to rails 32, 33. The resistance applied by the angled surface 72 against the engagement pin 66 may be overcome by a downward pushing force applied to the headrest 16. A specific downward pushing force applied to the headrest 16 enables adjustment of the headrest 16 to the stowed position without having to disengage the engagement pin 66 from the plurality of notches 69. The edge 70 prevents the engagement pin 66 and rods 30, 31 from sliding upwards relative to rails 32, 33. As such, the engagement pin 66 must be disengaged from the plurality of notches 69 in order to enable adjustment of the headrest 16 to the unstowed position.

Referring to FIGS. 2-3, adjustment of the headrest 16 is enabled when a user pulls upwards on the adjustment device 40 and the cable 50 disengages the locking engagement 60 from at least one of the first or second rails 32, 33. Pulling up on the adjustment device 40 pulls the cable 50 and the tab 62 in the direction of the adjustment device 40, shown by arrow I. When the tab 62 is pulled towards the adjustment device 40, the locking engagement 60 pivots about the pivoting member 64 and the engagement pin 66 is disengaged from the plurality of notches 69 as shown by arrow II. While the locking pin 66 is disengaged from the plurality of notches 69, the rods 30, 31 are freely translatable about the rails 32, 33 and a pushing or pulling force exerted on the headrest 16 adjusts the height of the headrest 16. With the locking pin 66 disengaged, a downward pushing force exerted on the headrest 16 will adjust the headrest 16 into the stowed position, wherein the headrest 16 is concealed within the housing 20. An upward pulling force exerted on the headrest 16 will adjust the headrest 16 into the unstowed position, wherein the headrest 16 is exposed above the seatback 12.

When the adjustment device 40 is released, the spring 68 forces the locking engagement 60 to pivot, and the engagement pin 66 reengages one of the plurality of notches 69 on rail 32 at the orthogonal edge 70. Reengaging the engagement pin 66 to one of the plurality of notches 69 holds the headrest 16 in position. Each of the plurality of notches 69 is associated with a unique position of the headrest 16. Further, at least one of the plurality of notches 69 on rails 32, 33 may correspond to at least one intermediate position of the headrest 16, wherein the headrest 16 is at least partially concealed within the housing 20.

Referring to FIGS. 1-3, a headrest assembly 18 includes a headrest 16 coupled to a seatback 12. The seatback 12 includes a housing 20. The headrest 16 is movable between a first position wherein the headrest 16 is exposed above seatback 12, and a second position wherein the headrest 16 is concealed within the housing 20. An upward pulling force exerted on the headrest 16 adjusts the headrest 16 to the first position. A downward pushing force exerted on the headrest 16 adjusts the headrest 12 to the second position. The headrest 16 may be movable to at least one intermediate position, wherein the headrest 16 is at least partially concealed within the housing 20. An adjustment device 40 is disposed on the top 41 of the headrest 16 and configured to enable adjustment of the headrest 16 when engaged. A cable 50 connects the adjustment device 40 to the locking engagement 60, and is configured to disengage the locking engagement 60 from the rail 32 when the adjustment device 40 is engaged. The adjustment device 40 is flush with the top 14 of the seatback 12 when the headrest 16 is in the second position. A rail 32 is disposed within the seatback 12 and is operably coupled to the headrest 16. The headrest assembly 18 includes a rod 30 movably coupled to the rail 32, and the pushing or pulling force exerted on the headrest 16 results in translational displacement of the rod 30 about the rail 32 to enable adjustment of the headrest 16 between first and second positions. A locking engagement 60 is coupled to the rod 30 and configured to engage one of a plurality of notches 69 extending a length of the rail 32 to hold the position of the headrest 16. Each of the plurality of notches 69 is associated with a unique position of the headrest 16. A specific downward force exerted on the headrest 16 enables adjustment of the headrest 16 to the second position without engaging the adjustment device 40.

Figure 4:
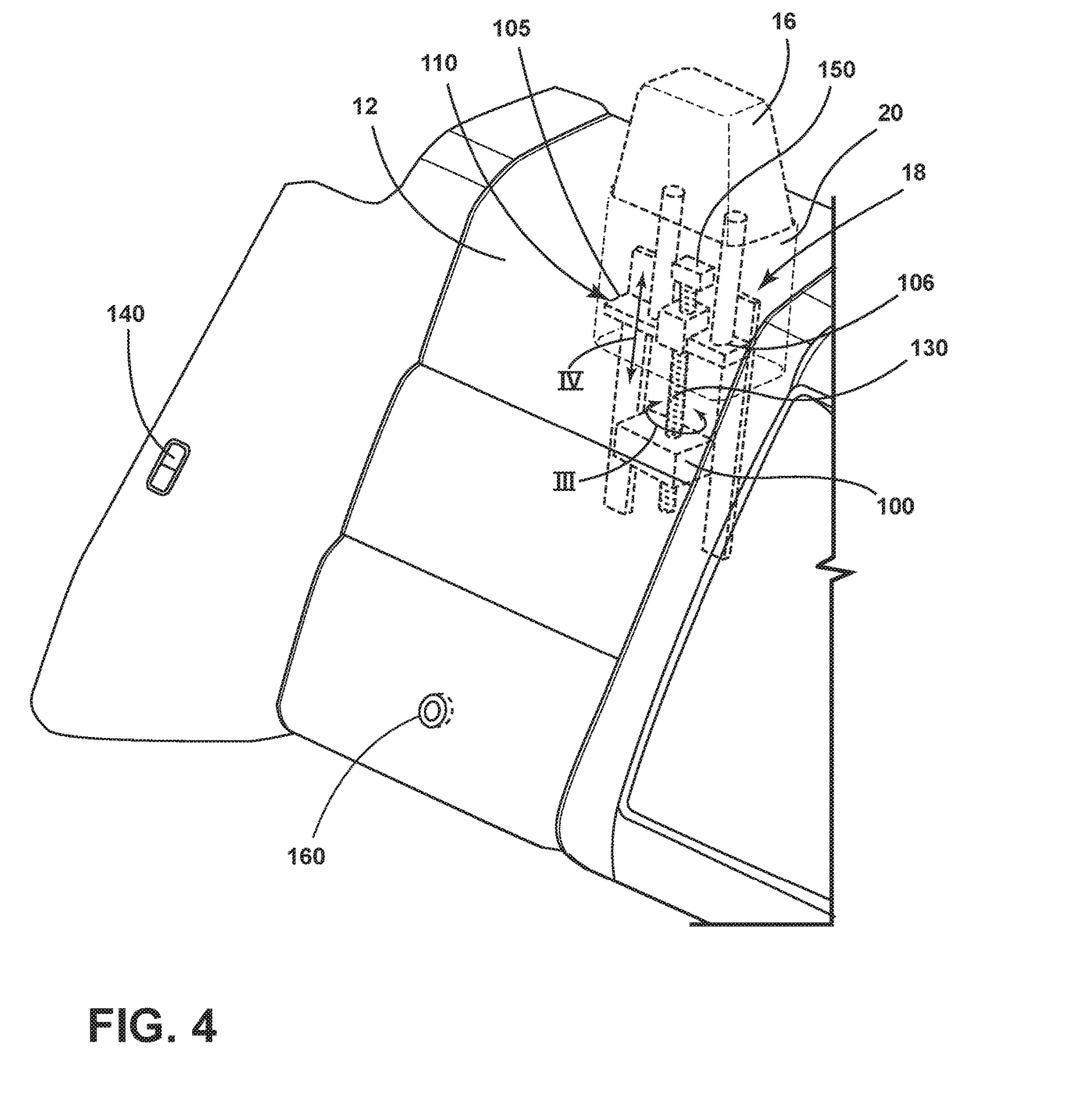
FIG. 4 illustrates the headrest assembly including an actuator according to one embodiment of the present disclosure.

In the second embodiment illustrated in FIG. 4, the headrest assembly 18 includes an actuator 100 configured to adjust the headrest 16 between stowed and unstowed positions. The actuator 100 is disposed within the seatback 12 and configured to raise or lower a bracket 110 supporting the headrest 16. The bracket 110 is disposed within the seatback 12 and is coupled to a frame 120 proximate to the housing 20. The bracket includes a first and a second platform 105, 106 movably coupled to a first and a second beam 125, 126 of the frame 120, respectively. A first and second arm 130, 131 extend vertically from the first and second platforms 105, 106 of the bracket 100 to support the headrest 16. The bracket 110 is configured to slide translationally about the first and second beams 125, 126 of the frame 120. Movement of the bracket 110 about the frame 120 results in adjustment of the headrest 16 position relative to the housing 20.

Referring again to FIG. 4, the headrest 16 is shown in the unstowed position and is fully exposed above the seatback 12. In order to power movement of the bracket 110 about the frame 120, the actuator 100 is operably coupled to a screw 130 that extends vertically to couple to the bracket 110. When activated, the actuator 100 rotates the screw 130 longitudinally, as shown by arrow III. As the screw 130 is rotated, the bracket slides up or down about the screw 130 and the frame 120, as shown by arrow IV. An activation switch 140 is configured to activate the actuator 100 to adjust the headrest 16 position, and may be positioned on either side of the seatback 12 or disposed on a door panel (not shown). The activation switch 140 has a first option configured to lower the headrest 16 to the stowed position, and a second option configured to raise the headrest 16 to the unstowed position. When the first option of the activation switch 140 is engaged, the actuator 100 rotates the screw 130 in a first rotational direction. The first rotational direction of the screw 130 corresponds to a downward adjustment of the bracket 110 and the headrest 16 from the unstowed position to the stowed position, with the top 41 of the headrest 16 flush with the top 14 of the seatback 12. When the second option of the activation switch 140 is engaged, the actuator 100 rotates the screw 130 in a second rotational direction. The second rotational direction of the screw 130 corresponds to upward adjustment of the bracket 110 and the headrest 16 from the stowed position to the unstowed position. A block 150 is located on the top of the screw 130 and is configured to prevent decoupling of the bracket 110 from the screw 130. When the block 150 contacts the bracket 110 the headrest 16 may be in the unstowed position and fully exposed above the seatback 12. Additionally, the actuator 100 may be configured to adjust the headrest 16 to at least one intermediate position wherein the headrest 16 is at least partially concealed within the housing 20.

With continued reference to the second embodiment as depicted in FIG. 4, a pressure sensor 160 may be disposed within the vehicle seat 10 or seatback 12. The pressure sensor 160 is configured to detect the presence of a passenger in the vehicle seat 10 and send a signal to the actuator 100 to adjust the position of the headrest 16 from the unstowed position. Additionally, the pressure sensor 160 may be configured to send a signal to the actuator 100 to adjust the position of the headrest 16 to the stowed position when the pressure sensor 160 does not detect an occupant. The pressure sensor 160 may be connected to a controller (not shown), the controller including a set of predefined headrest 16 adjustments. The controller may send a signal to the actuator 100 to adjust the headrest 16 to at least one preset headrest 16 position when the pressure sensor 160 detects a passenger. The preset headrest 16 position may be an intermediate, stowed, or unstowed position.

Referring to FIG. 4, the headrest assembly 18 includes a headrest 16 coupled to a seatback 12, the seatback 12 including a housing 20. A bracket 110 supports the headrest 16 and is disposed within the seatback 12. The headrest 16 is movable between a first position wherein the headrest 16 is exposed above the seatback 12, and a second position wherein the headrest 16 is concealed within the housing 20. The headrest 16 is fully concealed within the housing 20 while in a second position. An actuator 100 is configured to raise or lower the bracket 110 to adjust the headrest 16 between the first and second position. The actuator 100 is configured to adjust the headrest 16 to at least one intermediate position wherein the headrest 16 is at least partially concealed within the housing 20. An activation switch 140 is configured to activate the actuator 100 to adjust the position of the headrest 16. Additionally, the headrest 16 assembly includes at least one arm 130 that couples the headrest 16 to the bracket 110. The bracket 110 is movably coupled to a frame 120 disposed within the seatback 12. The actuator 100 is configured to move the bracket 110 vertically about the frame 120 to adjust the headrest 16 position. The actuator 100 is configured to rotate a screw 130 coupled to the bracket 110, the rotation of the screw 130 results in displacement of the bracket 110 about the frame 120 to adjust the headrest 16 position. A block 150 may be at one end of the screw 130 and configured to stop rotation of the screw 130 when the block 150 makes contact with the bracket 110. The vehicle seat 10 may include a pressure sensor 160 configured to send a signal to the actuator 100 to adjust the position of the headrest 16 when an occupant is in the vehicle seat 10. The pressure sensor 160 may additionally be configured to send a signal to the actuator 100 to adjust the position of the headrest 16 to the second position when the vehicle seat 10 is not in use. The actuator 100 may be programmed to adjust the position of the headrest 16 to a specific position when the pressure sensor 160 detects a passenger.

Accordingly, a headrest assembly for a vehicle seat has been advantageously provided herein. The headrest is configured to be stowed within a housing of a seatback, such that the top of the headrest is flush with the top of the seatback. The headrest may include an adjustment device on the top of the seatback that enables manual adjustment of the headrest between the stowed position and an unstowed position. The headrest may additionally include an actuator configured to adjust the headrest between the stowed and unstowed positions. Pressure sensors located within a vehicle seat may signal the actuator to adjust the headrest to a desired position when the pressure sensor does or does not detect a vehicle seat passenger.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the components of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, components shown as integrally formed may be constructed of multiple parts, or elements shown as multiple parts may be integrally formed, the length or width of the structures may be varied, and the nature or number of adjustment positions provided between the components may be varied. It should be noted that the components may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A headrest assembly, comprising:
   a headrest coupled to a seatback;
   the seatback comprising a housing;
   the headrest movable between a first position wherein the headrest is exposed above the seatback, and a second position wherein the headrest is concealed within the housing;
   wherein a pushing or pulling force exerted on the headrest enables adjustment of the headrest between first and second positions; and
   a rail disposed within the seatback and operably coupled to the headrest, wherein the headrest comprises a rod movably coupled to the rail, the pushing or pulling force resulting in translational displacement of the rod about the rail to enable adjustment of the headrest between the first and second positions.

2. The headrest assembly of claim 1, further comprising a locking engagement coupled to the rod and configured to engage one of a plurality of notches extending a length of the rail to hold the position of the headrest.

3. The headrest assembly of claim 2, further comprising a cable coupled to both the adjustment device and locking engagement and configured to disengage the locking engagement from one of the plurality of notches when the adjustment device is engaged.

4. The headrest assembly of claim 2, wherein each of the plurality of notches is associated with a unique position of the headrest.

5. A headrest assembly, comprising:
   a headrest coupled to a seatback, the seatback comprising a housing;
   a bracket supporting the headrest and disposed within the seatback;
   the headrest movable between a first position wherein the headrest is exposed above the seatback, and a second position wherein the headrest is concealed within the housing; and
   an actuator configured to raise or lower the bracket to adjust the headrest between the first and second positions, wherein the bracket is movably coupled to a frame disposed within the seatback, and wherein the actuator is configured to rotate a screw coupled to the bracket, and rotation of the screw causes the bracket to translate about the frame and an adjustment of the headrest position.

6. The headrest assembly of claim 5, wherein at least one arm couples the headrest to the bracket.

7. The headrest assembly of claim 5, wherein the actuator is configured to move the bracket vertically about the frame to adjust the headrest position.

8. The bracket assembly of claim 5, further comprising a block at one end of the screw configured to stop rotation of the screw when the block makes contact with the bracket.

9. A headrest assembly, comprising:
   a headrest coupled to a seatback, the seatback comprising a housing;
   a bracket supporting the headrest and disposed within the seatback;

the headrest movable between a first position wherein the headrest is exposed above the seatback, and a second position wherein the headrest is concealed within the housing;

an actuator configured to raise or lower the bracket to adjust the headrest between the first and second positions; and a pressure sensor configured to send a signal to the actuator to adjust the position of the headrest when an occupant is in a vehicle seat.

10. The headrest assembly of claim 9, wherein the pressure sensor is configured to send a signal to the actuator to adjust the position of the headrest to the second position when there is no occupant in the vehicle seat.

11. The headrest assembly of claim 9, wherein the actuator is programmed to adjust the headrest to a specific position when the pressure sensor detects an occupant in the vehicle seat.

* * * * *